UNITED STATES PATENT OFFICE.

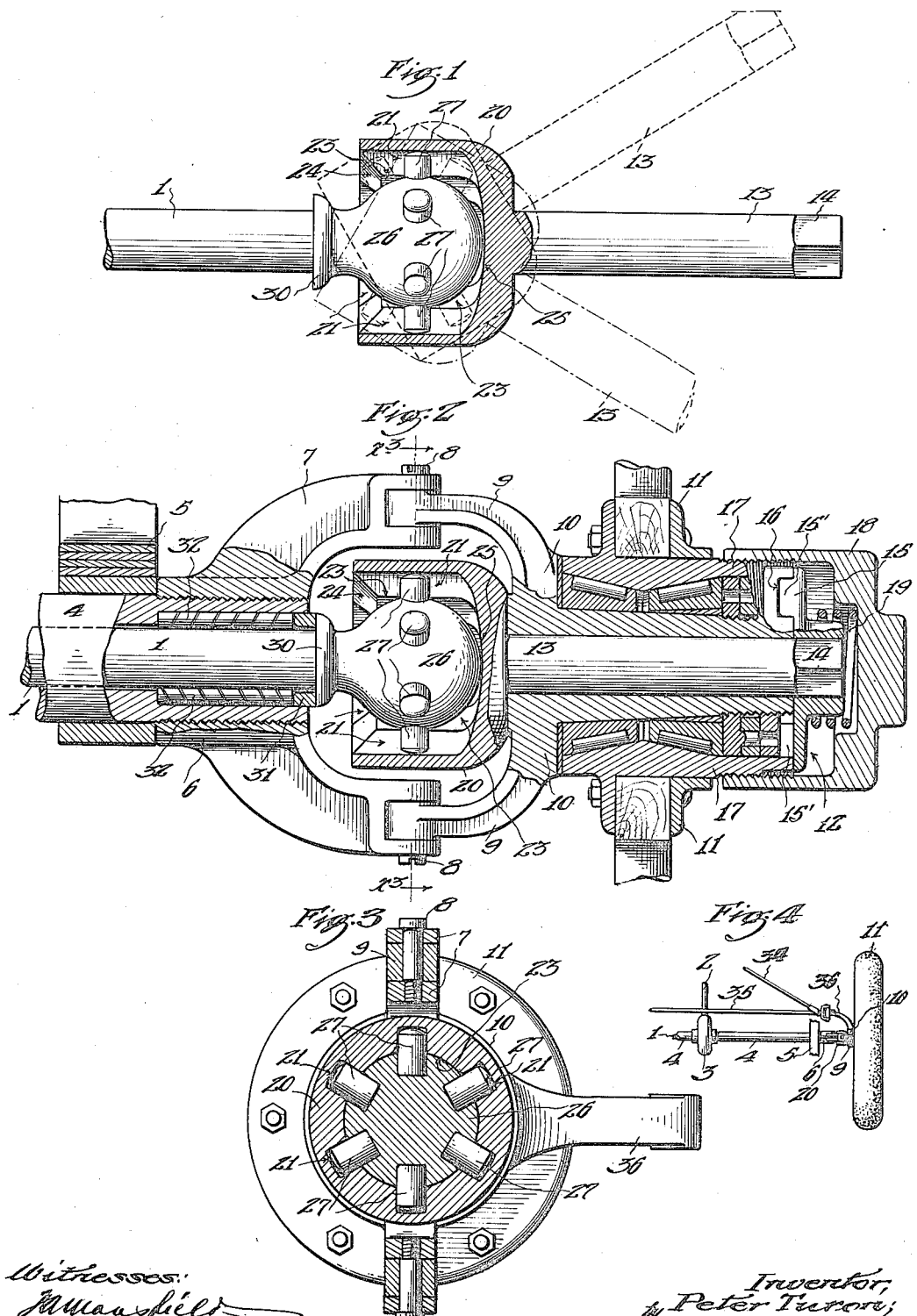

PETER TURON, OF LOS ANGELES, CALIFORNIA.

UNIVERSAL SHAFT-COUPLING.

1,155,629.  Specification of Letters Patent.  Patented Oct. 5, 1915.

Application filed January 4, 1915. Serial No. 520.

*To all whom it may concern:*

Be it known that I, PETER TURON, a citizen of the United States, residing at Los Angeles, in the county of Los Angeles, State of California, have invented a new and useful Universal Shaft-Coupling, of which the following is a specification.

In United States Letters Patent, No. 1,012,936, granted to me on the 26th day of December, 1911, I disclosed a front wheel drive for automobiles in which a common form of universal joint was shown for connecting the front axle of the automobile to an extension thereof which formed the axle for the wheel of the machine. I have discovered that the common forms of universal joint connection are inadequate for this purpose in view of the fact that when the front wheels of an automobile are used for driving, the various parts are subjected to sudden and heavy shocks of various kinds derived mainly on account of inequalities in the surface of roadways, and one of the main objects of my present invention is to produce a coupling of the class described of simple form and construction and which has approximately large areas of bearing surfaces in the different positions that the same may attain. Other objects and advantages will appear hereinafter.

Referring to the drawings which are for illustrative purposes only: Figure 1 is a plan view, partly in section, of a coupling embodying my invention. Fig. 2 is a side elevation, partly in section, of the device shown in Fig. 1 showing the manner of mounting the same on an automobile. Fig. 3 is a sectional view on the line $x^3$—$x^3$ of Fig. 2. Fig. 4 is a plan view of a portion of the front axle of an automobile and wheel thereon.

1 designates the front axle or shaft of an automobile, 2 the shaft for transmitting power thereto, and 3 the differential or balanced gear device, the axle 1 being divided into two parts and connected to the differential as is ordinarily done. The axle 1 is inclosed in a tubular casing 4 which is in fixed relation to the chassis, the outer end of the casing 4 being attached to springs 5 of the chassis so as to support the chassis on wheels. To support the wheels in fixed vertical relation to the chassis in such a manner as to permit a deflecting movement of the wheels for the purpose of steering, a collar 6 is provided which is threaded on the end of the casing as shown in Fig. 2. The collar 6 is provided with a pair of arms 7 pivoted at 8 by means of suitable bolts to arms 9 on the journal 10 of the wheel 11. The wheel 11 may be mounted upon the journal 10 in various ways but I prefer to mount the same in the manner shown and described in my patent above referred to. The wheels in the present instance are held in place by means of a sectional locking nut indicated at 12.

13 designates the stub shaft extending through the journal 10, the outer end of the stub shaft being squared as indicated at 14, which squared portion is engaged by means of a locking member 15 provided with teeth or lugs 15' which engage in recesses 16 formed in the hub 17 of the wheel. A cap 18 is provided which screws on the hub 17 of the wheel for the purpose of inclosing the connecting means just described and which also serves to carry a coiled spring 19 which engages the locking member 15 to hold the same in engagement with the hub 17. The inner end of the stub shaft 13 terminates in a cup 20, the inner face of which is provided with a series of grooves 21 which extend longitudinally of and parallel to the axis of the stub shaft 13. The inner face 23 of the cup is flared outwardly at the mouth of the cup as indicated at 24 and the inner end or bottom of the cup is rounded as indicated at 25. The outer end of the axle 1 terminates in a ball 26 which enters the cup 20 and which is provided with a series of radially extending pins 27, there being one pin for each groove in the cup 20. The pins 27 are secured in the ball 26 in any suitable manner and are placed about the greatest circumference of the ball 26 in such a manner that when the parts are assembled the pins 27 are in a plane which passes through the axis of the pivot of the arms 7 and 9. It is particularly to be noted that the ball 26 has a large bearing surface between the pins 27 in contact with the inner face of the cup 20 which faces remain in contact in any position the parts may assume as more fully hereafter noted and that the pins are of slightly smaller diameter than the width of the grooves in the cup, thereby allowing sufficient play to permit relative angular movement between the main and stub shaft. The pins 27 being cylindrical in shape also have a considerable bearing face in engagement with the sides of the grooves at one side thereof in any position assumed by the respective parts.

30 designates a collar on the shaft 1 which engages a ring 31 which bears against the end of roller bearings 32 between the shaft 1 and the tubular casing 4.

It is understood that the wheel 11 is one of the front wheels of an automobile and the same is guided for steering purposes by means of a steering rod 34 which is connected to a rod 35, which rod 35 is connected by means of a rigid extension 36 on the arms 9, the wheel at the opposite side of the machine being similarly connected which connection as above described permits the steering of the front wheels in unison.

My present invention particularly resides in the ball and cup coupling or connection between the shaft, and the stub shaft 13. Fig. 1 illustrates more particularly the angular positions which the stub shaft 13 may assume with relation to the shaft 1, one extreme position being shown in dotted lines and the other in dot and dash lines in either of which it is to be noted that approximately half of the length of the pins 27 is in engagement with their respective grooves 21 in the cup 20 and that in any of the positions shown or in any intermediate position the full circumference of the ball between the pins 27 is in engagement with the inner face of the cup 20 between the grooves formed therein. It is further to be particularly noted that the inner face of the cup 20 is parallel to the axis of the stub shaft 13, and I have found that there is considerable relative longitudinal movement between the axle 1 and the stub shaft 13 due to the shocks and vibrations of the different parts of the machine in traveling over the road and with the form of coupling which I have herein shown and described it is to be noted that the ball 26 may assume different longitudinal positions in the cup and in such positions the bearing surface of the ball on the inner face of the cup and the pins in the grooves in the cup remain substantially the same.

What I claim is:

1. In combination, a stub shaft, a cup on said stub shaft, said cup having a series of longitudinal grooves formed in the inner face thereof parallel to the axis of the cup, the bottom of said grooves being parallel to the inner face of said cup, a main shaft, a ball on the end of said main shaft adapted to enter said cup and circumferentially engage the inner face of said cup the entire distance between said grooves, a series of pins on said ball adapted to enter the slots in said cup, said pins being adapted to engage the sides of the slots.

2. In combination, a fixed member, a main shaft mounted therein, a laterally movable member pivotally connected to said fixed member, a stub shaft mounted in said laterally movable member, a cup formed on one end of said stub shaft having a series of longitudinal grooves therein, the bottom of said grooves and the inner face of said cup being substantially parallel with the axis of said cup, a ball on one end of said main shaft, a series of pins arranged circumferentially on said ball in a plane at right angles to the axis of said main shaft, and said movable member, said pins having straight sides adapted to engage the sides of said grooves during the lateral movement of said movable member, and said ball being in circumferential engagement with the inner face of said cup during such movement.

In testimony whereof, I have hereunto set my hand at Los Angeles, California, this 26th day of December, 1914.

PETER TURON.

In presence of—
 FRANK L. A. GRAHAM,
 P. H. SHELTON.